(12) United States Patent
Baek

(10) Patent No.: US 12,086,611 B2
(45) Date of Patent: Sep. 10, 2024

(54) ELECTRONIC DEVICE FOR EXECUTING APPLICATION IN BACKGROUND PROCESS AND OPERATING METHOD OF THE ELECTRONIC DEVICE

(71) Applicant: SAMSUNG ELECTRONICS CO., LTD., Suwon-si (KR)

(72) Inventor: Injune Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 18/109,606

(22) Filed: Feb. 14, 2023

(65) Prior Publication Data

US 2023/0236842 A1 Jul. 27, 2023

Related U.S. Application Data

(63) Continuation of application No. PCT/KR2023/000808, filed on Jan. 17, 2023.

(30) Foreign Application Priority Data

Jan. 27, 2022 (KR) .......................... 10-2022-0012593

(51) Int. Cl.
G06F 1/24 (2006.01)
G06F 9/445 (2018.01)
G06F 9/4401 (2018.01)

(52) U.S. Cl.
CPC ............ *G06F 9/445* (2013.01); *G06F 9/4401* (2013.01)

(58) Field of Classification Search
CPC .......... G06F 9/445; G06F 9/48; G06F 9/4843; G06N 3/04; G06N 3/047; G06N 3/08

(Continued)

(56) References Cited

U.S. PATENT DOCUMENTS 9,462,965 B2 * 10/2016 Stanley-Marbell ... G06F 9/4893
9,974,045 B2 * 5/2018 Ghosh ................... H04W 4/029

(Continued)

FOREIGN PATENT DOCUMENTS

JP         5920708 B2    5/2016
KR   10-2018-0078338 A   7/2018

(Continued)

OTHER PUBLICATIONS

International Search Report dated Apr. 26, 2023, issued by the International Searching Authority in counterpart International Application No. PCT/KR2023/000808 (PCT/ISA/220, PCT/ISA/210, PCT/ISA/237).

(Continued)

*Primary Examiner* — Volvick Derose
(74) *Attorney, Agent, or Firm* — Sughrue Mion, PLLC

(57) ABSTRACT

A method includes obtaining feature data including one or more features and obtaining priority information corresponding to the one or more features of the feature data. The method includes, based on the priority information, dividing the one or more features into first features and second features, compressing the second features, and combining the first features with the compressed second features. The method includes obtaining preprocessed features by applying a combination of the first features and the compressed second features to a plurality of first machine learning models. The method includes obtaining, by applying the preprocessed features to a second machine learning model, probability values of a plurality of applications that are predicted to be executed on the electronic device. The method includes, based on the probability values, executing one or more applications from among the plurality of applications in the background process of the electronic device.

20 Claims, 12 Drawing Sheets

(58) Field of Classification Search
USPC .......................................................... 713/2
See application file for complete search history.

(56) References Cited

U.S. PATENT DOCUMENTS

| | | | |
|---|---|---|---|
| 10,592,813 B1* | 3/2020 | Ciarlini | G06Q 10/063 |
| 11,042,386 B2* | 6/2021 | Chen | G06F 9/44521 |
| 11,221,937 B1* | 1/2022 | Kerlin | G06N 20/00 |
| 11,422,831 B2* | 8/2022 | Zeng | G06N 20/20 |
| 11,531,529 B2 | 12/2022 | Zhang et al. | |
| 2014/0298347 A1* | 10/2014 | Aylesworth | H04L 67/535 |
| | | | 718/104 |
| 2014/0366041 A1* | 12/2014 | Stanley-Marbell | G06F 9/542 |
| | | | 719/318 |
| 2015/0286820 A1* | 10/2015 | Sridhara | G06F 1/3206 |
| | | | 713/320 |
| 2015/0347204 A1* | 12/2015 | Stanley-Marbell | ...................... |
| | | | A61B 5/1118 |
| | | | 719/318 |
| 2018/0365521 A1 | 12/2018 | Dai et al. | |
| 2020/0296177 A1* | 9/2020 | Hammer | G06Q 30/0202 |
| 2020/0356803 A1* | 11/2020 | Yang | G06N 3/048 |
| 2021/0103452 A1* | 4/2021 | Pratt | G06Q 30/0283 |
| 2021/0103462 A1 | 4/2021 | Yudanov et al. | |
| 2021/0165702 A1* | 6/2021 | Kao | H04L 65/764 |
| 2021/0191739 A1* | 6/2021 | Chen | G06F 11/302 |
| 2021/0208906 A1* | 7/2021 | Hands | G06F 9/485 |
| 2021/0365806 A1* | 11/2021 | Sumanth | G06N 20/00 |
| 2024/0095319 A1* | 3/2024 | Gillikin | G06F 21/316 |

FOREIGN PATENT DOCUMENTS

| | | |
|---|---|---|
| KR | 10-1945117 B1 | 2/2019 |
| KR | 10-2150561 B1 | 9/2020 |
| KR | 10-2167747 B1 | 10/2020 |
| KR | 10-2021-0066754 A | 6/2021 |
| KR | 10-2297548 B1 | 9/2021 |
| KR | 10-2022-0002823 A | 1/2022 |

OTHER PUBLICATIONS

Yan, "Fast App Launching for Mobile Devices Using Predictive User Context", MobiSys '12: Proceedings of the 10th international conference on Mobile systems, applications, and services, Jun. 2012, ACM, 15 pages total.

* cited by examiner

ELECTRONIC DEVICE FOR EXECUTING APPLICATION IN BACKGROUND PROCESS AND OPERATING METHOD OF THE ELECTRONIC DEVICE

CROSS-REFERENCE TO RELATED APPLICATION

This application is a by-pass continuation application of International Application No. PCT/KR2023/000808, filed on Jan. 17, 2023, which claims priority to Korean Patent Application No. 10-2022-0012593, filed on Jan. 27, 2022, in the Korean Intellectual Property Office, the disclosure of each of which are incorporated by reference herein in its entirety.

BACKGROUND

1. Field

The disclosure relates to an electronic device for executing an application in a background process and an operating method of the electronic device.

2. Description of the Related Art

In an electronic device, a plurality of applications may be executed in advance in a background process for quick execution of the applications.

Examples of a method of executing an application in advance on an electronic device include executing a frequently used application in a background process, executing an application recently used by a user in a background process, keeping an application most recently terminated by a user running in a background process without actually terminating the application, etc. Also, when a machine learning model is used to predict an application to be executed in a background process, computing resources to be allocated to the application executable in the background process are reduced due to use of computing resources required by the machine learning model.

SUMMARY

Embodiments of the disclosure provide an electronic device for determining applications to be executed in advance in a background process of the electronic device by processing and learning usage history data collected according to a user's usage pattern, and executing one or more applications in the background process within computing resources (a memory, etc.) of the electronic device, and an operating method of the electronic device.

One or more embodiments of the present disclosure are directed to a method of accurately predicting an application that is highly likely to be executed by a user on an electronic device, without using a large amount of computing resources of the electronic device.

According to one or more embodiments, a method, performed by an electronic device, of executing an application in a background process, comprises obtaining feature data including one or more features, each of the one or more features indicating one or more attributes related to a usage history of the electronic device; obtaining priority information corresponding to the one or more features of the feature data; based on the priority information, dividing the one or more features into first features and second features; compressing the second features; combining the first features with the compressed second features; obtaining preprocessed features by applying a combination of the first features and the compressed second features to a plurality of first machine learning models; obtaining, by applying the preprocessed features to a second machine learning model, probability values of a plurality of applications that are predicted to be executed on the electronic device; and based on the probability values, executing one or more applications from among the plurality of applications in the background process of the electronic device.

The method further includes, based on identifying an execution request for an application of the one or more applications executed in the background process, displaying the application corresponding to the execution request on a screen of the electronic device.

The obtaining of the priority information corresponding to the one or more features comprises: training a third machine learning model by using the one or more features; obtaining importance information of each of the one or more features, the importance information being determined in a training process of the third machine learning model; and determining a priority of each of the one or more features based on respective importance information for each of the one or more features.

The dividing of the features into the first features and the second features based on the priority information comprises, among the one or more features, dividing a first set of features having a priority higher than a threshold as the first features, and dividing other features not included in the first set of features as the second features, where a number of the first features is less than a number of the second features.

The compressing of the second features comprises applying a dimensionality reduction algorithm to the second features.

The plurality of first machine learning models comprise a plurality of machine learning models trained by using algorithms different from each other for each machine learning model in the plurality of machine learning models.

The second machine learning model is a machine learning model trained by using an ensemble algorithm.

The second machine learning model is obtained by transforming operations performed in the second machine learning model into code through a model-to-code (M2C) transformation, and the obtaining of the probability values of the applications that are predicted to be executed on the electronic device comprises executing the code obtained by transforming the second machine learning model through the M2C transformation.

The probability values of the applications that are predicted to be executed on the electronic device comprises: identifying a preset execution condition of the second machine learning model; and based on identifying an occurrence of the preset execution condition of the second machine learning model, obtaining the probability values by executing the code obtained by transforming the second machine learning model through the M2C transformation.

The preset execution condition of the second machine learning model comprises at least one of (i) a case in which power of the electronic device is turned on, (ii) a case in which an application running on the electronic device is switched, or (iii) a case in which a preset time interval has elapsed.

According to one or more embodiments, an electronic device for executing an application in a background process, comprises: a display; a memory storing one or more instructions; and a processor configured to execute the one or more instructions stored in the memory to: obtain feature data including one or more features, each of the one or more features indicating attributes related to a usage history of the electronic device, obtain priority information corresponding to the one or more features of the feature data, based on the priority information, divide the one or more features into first features and second features, compress the second features, combine the first features with the compressed second features, obtain preprocessed features by applying a combination of the first features and the compressed second features to a plurality of first machine learning models, obtain, by applying the preprocessed features to a second machine learning model, probability values of a plurality of applications that are predicted to be executed on the electronic device, and based on the probability values, execute at least one application from among the plurality of applications in the background process of the electronic device.

The processor is further configured to execute the one or more instructions to, based on an identification of an execution request for an application of the one or more applications executed in the background process, display the application corresponding to the execution request on a screen of the electronic device.

The processor is further configured to execute the one or more instructions to: train a third machine learning model by using the one or more features; obtain importance information of each of the one or more features, the importance information being determined in a training process of the third machine learning model; and determine a priority of each of the one or more features based on respective importance information for each of the one or more features.

The processor is further configured to execute the one or more instructions to: among the one or more features, divide a first set of features having a priority higher than a threshold as the first features, and divide other features not included in the first set of features as the second features, where a number of the first features is less than a number of the second features.

The processor is further configured to execute the one or more instructions to apply a dimensionality reduction algorithm to the second features.

The plurality of first machine learning models comprise a plurality of machine learning models trained by using algorithms different from each other for each machine learning model in the plurality of machine learning models.

The second machine learning model is a machine learning model trained by using an ensemble algorithm.

The second machine learning model is obtained by transforming operations performed in the second machine learning model into code through a model-to-code (M2C) transformation, and the processor is further configured to execute the one or more instructions to obtain the probability values by execution of the code obtained by transformation of the second machine learning model through the M2C transformation.

The processor is further configured to execute the one or more instructions to: identify a preset execution condition of the second machine learning model; and based on identification of an occurrence of the preset execution condition of the second machine learning model, obtain the probability values by executing the code obtained by transformation of the second machine learning model through the M2C transformation.

According to one or more embodiments, a non-transitory computer-readable medium having instructions stored therein, which when executed by a processor in an electronic device cause the processor to execute a method of executing an application in a background process, the method comprising: obtaining feature data including one or more features, each of the one or more features indicating attributes related to a usage history of the electronic device; obtaining priority information corresponding to the one or more features of the feature data; based on the priority information, dividing the one or more features into first features and second features; compressing the second features; combining the first features with the compressed second features; obtaining preprocessed features by applying a combination of the first features and the compressed second features to a plurality of first machine learning models; obtaining, by applying the preprocessed features to a second machine learning model, probability values of a plurality of applications that are predicted to be executed on the electronic device; and based on the probability values, executing one or more applications from among the plurality of applications in the background process of the electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
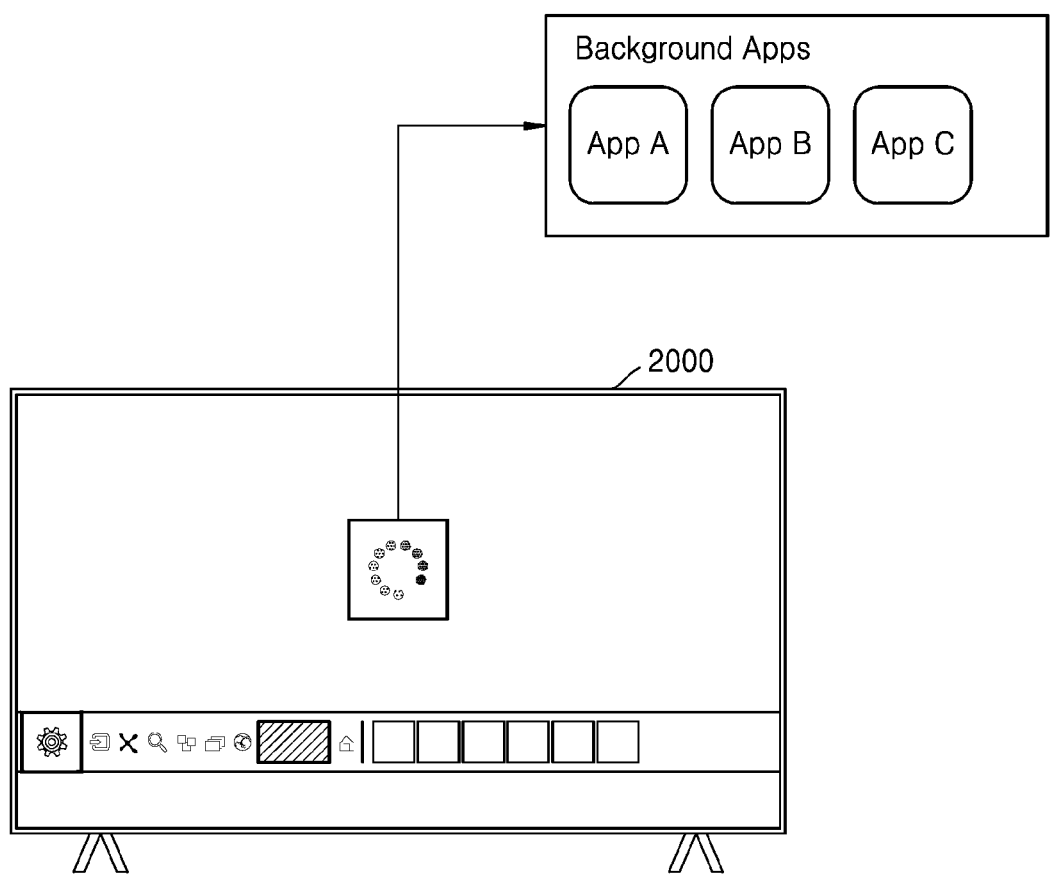
FIG. 1 is a schematic diagram for describing a method by which an electronic device executes an application in a background process, according to one or more embodiments of the disclosure.

Throughout the disclosure, the expression "at least one of a, b, or c" indicates only a, only b, only c, both a and b, both a and c, both b and c, or all of a, b, and c.

The terms used in the disclosure are those general terms currently widely used in the art in consideration of functions in regard to the disclosure, but the terms may vary according to the intention of those of ordinary skill in the art, precedents, or new technology in the art. In addition, in some cases, the applicant may arbitrarily select specific terms, in which case, the applicant will provide the meaning of the terms in the description of the disclosure. Thus, the terms used in the disclosure should be understood not as simple names but based on the meaning of the terms and the overall description of the disclosure.

As used herein, the singular forms "a", "an" and "the" are intended to include the plural forms as well, unless the context clearly indicates otherwise. All of the terms used herein including technical or scientific terms have the same meanings as those generally understood by those of ordinary skill in a technical field described herein. Also, terms including ordinal numbers, such as "first" or "second" used herein may be used to describe various elements, but the elements should not be construed as being limited by the terms. The above terms are used only for the purpose of distinguishing one element from another.

Throughout the specification, when a portion "includes" an element, another element may be further included, rather than excluding the existence of the other element, unless otherwise described. In addition, terms such as " . . . or/er", " . . . module", or the like refer to units that perform at least one function or operation, and the units may be implemented as hardware or software or as a combination of hardware and software.

Embodiments of the disclosure will now be described in detail with reference to accompanying drawings to be readily practiced by those of ordinary skill in the art. However, the disclosure may have different forms and should not be construed as being limited to the descriptions set forth herein. Also, elements not related to description are omitted in the drawings for clear description of the disclosure, and like reference numerals in the drawings denote like elements throughout the specification.

FIG. 1 is a schematic diagram of an electronic device that executes an application in a background process, according to one or more embodiments of the disclosure.

Referring to FIG. 1, the electronic device 2000, according to one or more embodiments of the disclosure may be a device that includes a display and outputs an image or a video. The electronic device 2000 may also output audio. For example, the electronic device 2000 may be a smart television (TV). However, the electronic device of the disclosure is not limited thereto, and the electronic device 2000 may be implemented as various types and shapes of electronic devices (e.g., a smartphone, a tablet personal computer (PC), a laptop PC, a frame-type PC, etc.) including a display.

The electronic device 2000 may include an electronic device configured to execute an application. For example, an application running on the electronic device may include a music streaming application, an over-the-top (OTT) service application, a real-time TV broadcasting application, a TV schedule table, a TV menu application, a multi-view application, a TV setting application, a voice application, or any other application known to one of ordinary skill in the art.

The electronic device 2000, according to one or more embodiments of the disclosure, may select one or more applications to be executed in advance in consideration of a capacity of computing resources of the electronic device 2000 (e.g., a memory of the electronic device 2000). The electronic device 2000 determines applications to be executed in advance in a background process of the electronic device 2000 by processing and learning usage history data collected according to a user's usage pattern. According to some embodiments, the electronic device 2000 may predict, at a future time, an application to be executed by the user by using machine learning, and execute the predicted application in the background process such that the application may be quickly executed when the user actually desires to use the application. For example, if it is predicted that the user will use Application X at a future time N, execution of the application may start in the background at a time before time N such that the user may quickly start using the application at time N.

In one or more embodiments of the disclosure, the electronic device 2000 may obtain probability values of applications that are predicted to be executed on the electronic device 2000, by using a machine learning model (e.g., a second model to be described below) which uses computing resources that do not affect the execution of the application, and may execute one or more applications in the background process of the electronic device 2000 based on the obtained probability values. When the machine learning model for determining applications to be executed in advance on the electronic device 2000 requires a large number of computing resources of the electronic device 2000 and affects the execution of the application, the number of applications executable in the background process of the electronic device 2000 may be reduced due to heavy use of computing resources of the machine learning model.

The electronic device 2000, according to one or more embodiments of the disclosure, may select an application to be executed with high accuracy even within a limited number of computing resources of the electronic device 2000, by using a machine learning model which uses computing resources that do not affect the execution of the application within the limited number of computing resources of the electronic device 2000.

For example, when the computing resources of the electronic device 2000 may execute three applications in the background process, the electronic device 2000 may select applications (application A, application B, and application C), which are highly likely to be executed on the electronic device 2000, by using the machine learning model, and the applications may be executed in the background process of the electronic device 2000.

Figure 2:
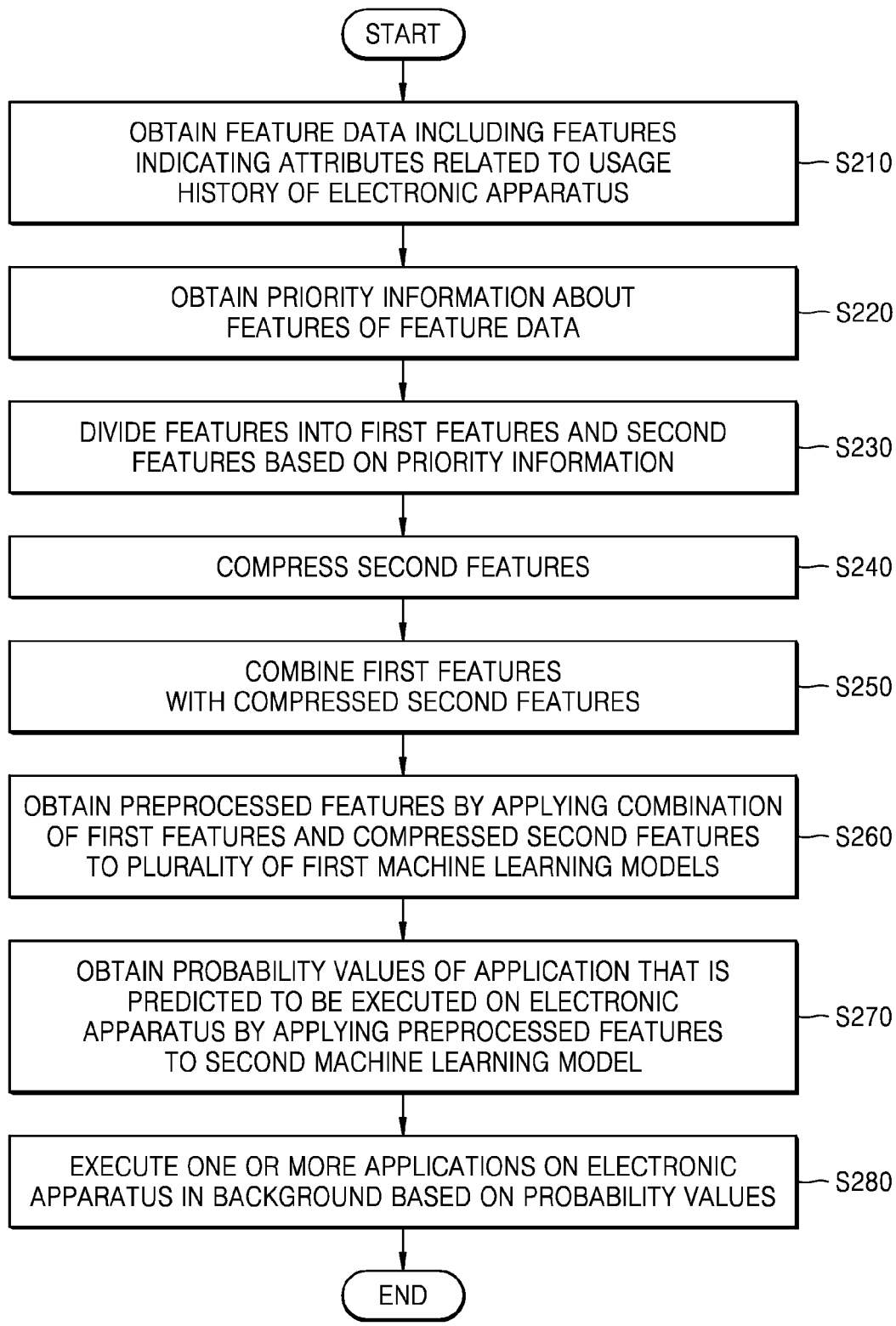
FIG. 2 is a flowchart for describing a method by which an electronic device executes an application in a background process, according to one or more embodiments of the disclosure.

FIG. 2 is a flowchart for describing a method by which the electronic device executes an application in a background process, according to one or more embodiments of the disclosure.

In operation S210, the electronic device 2000, according to one or more embodiments of the disclosure, obtains feature data. For example, the feature data may indicate attributes related to a usage history of the electronic device 2000 and/or a usage history of one or more applications.

In one or more embodiments of the disclosure, the electronic device 2000 may obtain usage history data. The usage history data may refer to various types of data collected in response to use of the electronic device 2000. In one or more examples, the usage history data may include data regarding an operation history of the electronic device 2000, data regarding a device environment setting history of the electronic device 2000, data regarding operation histories of applications installed or executed on the electronic device 2000, or any other usage history data known to one of ordinary skill in the art. The usage history data may include, for example, a turning on/off history of the electronic device 2000, an execution/termination history of an application installed on the electronic device 2000, device setting history information (e.g., a brightness setting, a volume setting, etc.) related to functions of the electronic device 2000, etc., but is not limited thereto. For example, the usage history data may include time information when an event related to the usage history occurs.

In one or more embodiments of the disclosure, the electronic device 2000 may obtain the feature data, including the features indicating the attributes related to the usage history of the electronic device 2000, by processing the usage history data. For example, the features indicating the attributes related to the usage history may refer to statistical data obtained by modifying/processing the usage history data. The features indicating the attributes related to the usage history may include, for example, the number of times the electronic device 2000 is turned on/off during a particular period, a time when the electronic device 2000 is turned on/off during a particular period, the number of executions/terminations of the application installed on the electronic device 2000 during a particular period, or any other statistical usage data known to one of ordinary skill in the art. A description of the feature data will be further described with reference to FIG. 4. Furthermore, in the following description, the features indicating the attributes related to the usage history may be referred to as features.

In operation S220, the electronic device 2000, according to one or more embodiments of the disclosure, may obtain priority information about the features of the feature data.

In one or more embodiments of the disclosure, the priority information about the features may be information about features that affect a prediction result. For example, the features may be listed in order when the electronic device 2000 predicts which application may be executed, and the priority information may indicate a relative importance of each of the features. The priority information may be a value ranging from 0 to K, where K is an integer number, with 0 representing the lowest priority and K representing the highest priority. The electronic device 2000 may obtain priority information pre-stored in the electronic device 2000 or may obtain priority information from another device (e.g., a server).

In one or more embodiments of the disclosure, the electronic device 2000 may determine the priority information about the features. The electronic device 2000 may train a machine learning model by using, for example, the features obtained in operation S210. In one or more examples, the machine learning model may be a machine learning model using an ensemble algorithm. The ensemble algorithm may refer to a machine learning technique that generates a strong classifier by combining a plurality of weak classifiers. The ensemble algorithm may be classified into a bagging technique and a boosting technique. The machine learning model may include, for example, a machine learning model using an extreme gradient boosting (XGBoost) module, which may be a boosting module. When the machine learning model is trained using the features, the electronic device 2000 may obtain importance of the features, which are determined in a training process of the machine learning model. The electronic device 2000 may determine a priority of a feature as high priority based on the importance information of the features. For example, the importance information may categorize a feature has critical or non-critical, where critical features are assigned higher priority.

In one or more examples, a priority of the number of times the electronic device 2000 is turned on/off during a particular period may be higher than a priority of the time when the electronic device 2000 is turned on/off during a particular period. However, the aforementioned priority information is merely exemplary, and may include any other type of priority information known to one of ordinary skill in the art. In one or more examples, a predetermined priority may be obtained as described above, or a priority determined by the electronic device 2000 may be obtained. For example, the electronic device 2000 may process one or more pieces of information to obtain the priority information.

In operation S230, the electronic device 2000, according to one or more embodiments of the disclosure, may divide the features into first features and second features based on the priority information.

In one or more embodiments of the disclosure, the electronic device 2000 may divide the features into the first features and the second features by classifying features having a relatively high priority as the first features, and classifying features having a relatively lower priority than the first features as the second features. The electronic device 2000 may divide the features into the first features and the second features based on a preset ratio. For example, the electronic device 2000 may classify the top N % features having a high priority as the first features, and classify the other features as the second features. For example, if there are 20 total features with 10 features marked as high priority and the remaining 10 features marked as low priority, and N is equal to 20%, the 2 highest priority features (e.g., 2/10) are classified as first features, and the remaining 8 high priority features and 10 low priority features are marked as second features.

In one or more examples, as a result of the electronic device 2000 dividing the features into the first features and the second features, a high-priority feature (e.g., the number of times the electronic device 2000 is turned on/off during a particular period) may be included in the first features, and a low-priority feature (e.g., the time when the electronic device 2000 is turned on/off during a particular period) may be included the second features. Furthermore, as a result of the electronic device 2000 dividing the features into the first features and the second features, the number of first features may be less than the number of second features.

In operation S240, the electronic device 2000, according to one or more embodiments of the disclosure, may compress the second features. The electronic device 2000 may compress the second features, which may be low-priority features, due to their importance being relatively lower than that of first features. As a result of the compression, the number of second features, data used by the second features may be reduced.

In one or more embodiments of the disclosure, the electronic device 2000, to compress the second features, may apply a dimensionality reduction algorithm to the second features. The dimensionality reduction algorithm may include, for example, principal component analysis (PCA). For example, the electronic device 2000 may compress the second features by using a feature extraction method of compressing and extracting the second features into lower-dimensional important features. However, the dimensionality reduction algorithm is not limited thereto, and other dimensionality reduction algorithms known to one of ordinary skill in the art, such as linear discriminant analysis (LDA) and singular value decomposition (SVD), may be used.

In operation S250, the electronic device 2000, according to one or more embodiments of the disclosure, may combine the first features with the compressed second features. In one or more embodiments of the disclosure, the electronic device 2000 may use a combination of the first features and the compressed second features as input data to be input to a plurality of first models. For example, the first features and the compressed second features may be included in a same data structure, where the data structure is inputted into a plurality of first machine learning models to obtain preprocessed features.

In operation S260, the electronic device 2000, according to one or more embodiments of the disclosure, may obtain preprocessed features by applying the combination of the first features and the compressed second features to a plurality of first machine learning models (hereinafter, referred to as first models). The preprocessed features may refer to features obtained by preprocessing the first features and the compressed second features by using the first models, which may be used by the electronic device 2000 to obtain one or more execution probability values of applications by using second machine learning models (hereinafter, referred to as second models).

In one or more embodiments of the disclosure, the electronic device 2000 may use the plurality of first models to analyze a correlation between features included in the first features and the compressed second features. In one or more examples, the plurality of first models may be lightweight machine learning models implemented such that the computation amount (e.g., processing requirements) and memory occupancy of these lightweight models are not relatively greater than those of general machine learning models. Furthermore, the plurality of first models may be one or more machine learning models trained by using algorithms different from each other. For example, the plurality of first models may include a "model A" that may be a machine learning model including a multi-layer perceptron (MLP) module that performs an operation between features, and a "model B" that may be a machine learning model that performs an operation by using a linear regression algorithm.

In one or more embodiments of the disclosure, the electronic device 2000 may collect preprocessed features respectively output from the plurality of first models. For example, the electronic device 2000 may collect a preprocessed feature "a" output from the "model A" and a preprocessed feature "b" output from the "model B" from the plurality of first models.

In operation S270, the electronic device 2000, according to one or more embodiments of the disclosure, may obtain probability values of applications that are predicted to be executed on the electronic device 2000 by applying the preprocessed features to a second machine learning model (hereinafter, referred to as a second model). In one or more examples, the preprocessed features may provide a measure regarding how closely related the first features and compressed second features are to each other. By preprocessing the combination of the first features and compressed second features using the plurality of first models, the probability values of the applications that predicted to be executed may be obtained with higher accuracy when the preprocessed features are inputted into the second model.

In one or more embodiments of the disclosure, the electronic device 2000 may use the second model to infer, based on the preprocessed features, execution probabilities of applications that are highly likely to be executed on the electronic device 2000. In one or more examples, the second model may be a machine learning model using the ensemble algorithm (e.g., a machine learning model using the XGBoost module, which may be a boosting module). Furthermore, the second model may not be stored in a file format (e.g., file containing source code) in the electronic device 2000, and may be obtained by transforming operations performed in the second model into code a through model-to-code (M2C) transformation.

In one or more embodiments of the disclosure, the electronic device 2000 may transform the second model into code and store the same in a compiled state, and execute the code to obtain probability values of applications to be executed on the electronic device 2000. As a result, a memory occupancy (e.g., amount of occupied memory) and file input/output overhead that occur compared to when the second model is stored in a file format may be reduced. Furthermore, a loading time and operation time of the second model may be reduced compared to the file format.

In one or more embodiments of the disclosure, the electronic device 2000 may execute the code transformed from the second model, in response to identifying the occurrence of a preset execution condition of the second model. For example, when the preset execution condition of the second model occurs, the electronic device 2000 may input the preprocessed features to the second model and receive, from the second model, probability values of applications that are highly likely to be executed on the electronic device 2000. After completion of operation S270, the electronic device 2000 may perform operation S280. In one or more examples, the preset execution condition of the second model may include, for example, a case in which the power of an electronic device is turned on.

In operation S280, the electronic device 2000, according to one or more embodiments of the disclosure, may execute one or more applications in a background process of the electronic device 2000 based on the probability values of applications that are predicted to be executed on the electronic device 2000. In one or more examples, a background process may refer to an execution of a process that is not visible to a user of the electronic device 2000, or a process that has not been activated by the user. In one or more examples, a list of background processes may be displayed to the user, where the user may activate the background process upon selection of one or more applications displayed in the interface. When an application is executed in the background process, rather than executing the application (e.g., displaying the application to the user), and in order to execute the application in the background of the electronic device 2000, data related to the application may be loaded into operating memory so that the application may be immediately executed by using available computing resources (e.g., memory and processor computations) of the electronic device 2000. The electronic device 2000 may identify the available computing resources of the electronic device 2000 and determine the number of applications that may be executed in the background process based on the available computing resources.

Figure 3:
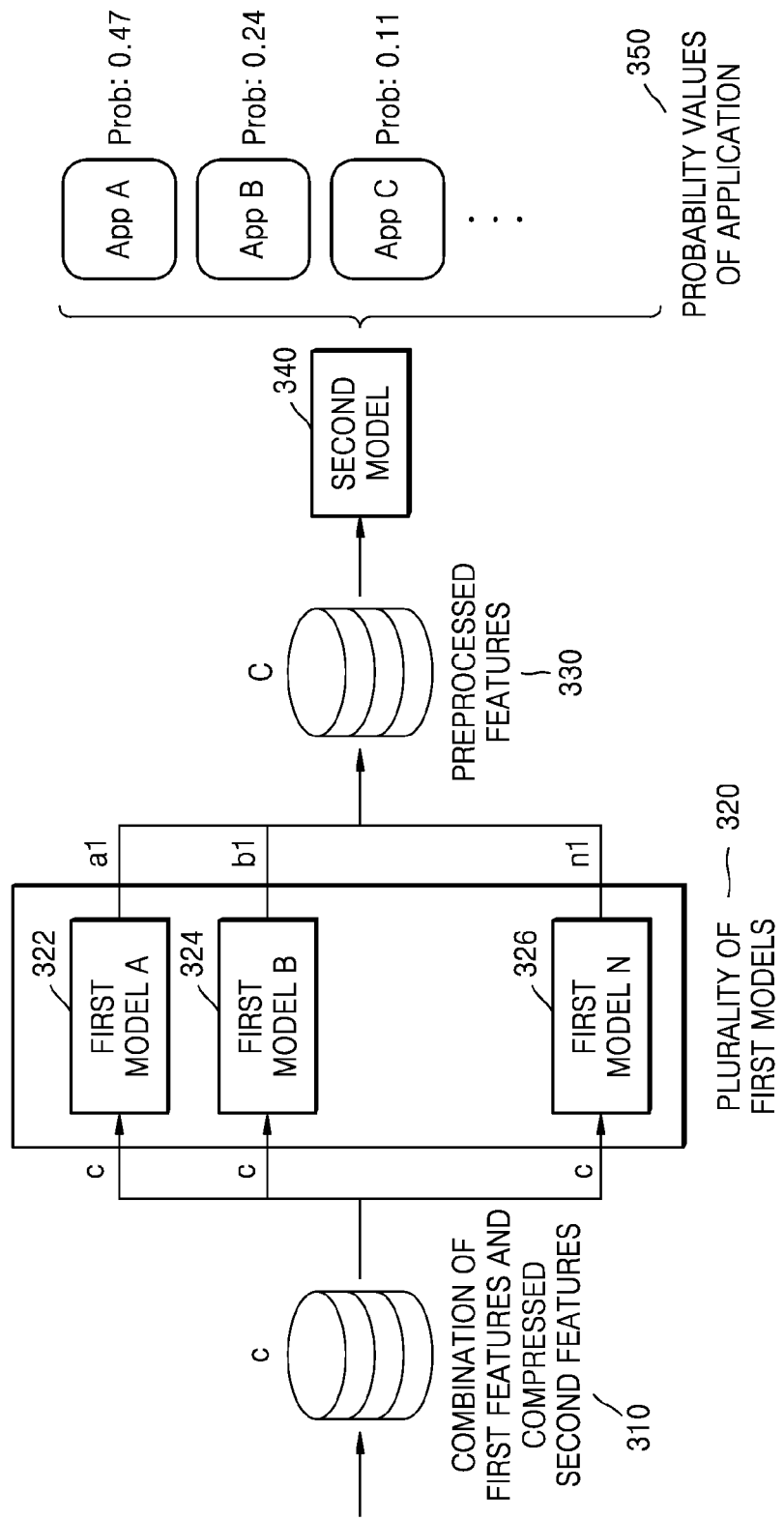
FIG. 3 is a diagram for describing an operation in which an electronic device obtains, by using a first model and a second model, probability values of applications that are predicted to be executed on the electronic device, according to one or more embodiments of the disclosure.

FIG. 3 is a diagram for describing an operation in which the electronic device obtains, by using a first model and a second model, probability values of applications that are predicted to be executed on the electronic device, according to one or more embodiments of the disclosure.

The electronic device 2000, according to one or more embodiments of the disclosure, may obtain probability values 350 of applications that may be predicted to be executed on the electronic device 2000, by obtaining usage history data of the electronic device 2000, processing the usage history data, and inputting the usage history data into a machine learning model.

The electronic device 2000, according to one or more embodiments of the disclosure, may obtain preprocessed features 330 by applying a combination 310 of first features and compressed second features to a plurality of first models 320. An operation in which the electronic device 2000 obtains the combination 310 of first features and compressed second features will be described with reference to FIGS. 4 and 5.

Referring to FIG. 3, the combination 310 of first features and compressed second features "c" may be input to each of the plurality of first models 320, which may include a "first model A 322", a "first model B 324", . . . , and a "first model N 326". The plurality of first models 320 may be machine learning models for obtaining the preprocessed features 330 by analyzing a correlation between features included in the combination 310 of first features and compressed second features. In one or more examples, the plurality of first models 320 may be machine learning models trained by using algorithms different from each other. For example, among the plurality of first models 320, the "first model A 322" may be a machine learning model including an MLP module that performs an operation between features (e.g., features "c"), and the "first model B 324" may be a machine learning model that performs an operation by using a linear regression algorithm. Furthermore, other first models may be machine learning models using other machine learning algorithms known to one of ordinary skill in the art.

The electronic device 2000 may collect preprocessed features output from the plurality of first models 320. For example, a preprocessed feature a1 may be output from the first model A 322, a preprocessed feature b1 may be output from the first model B 324, and a preprocessed feature n1 may be output from the first model N 326. The electronic device 2000 may obtain preprocessed features 330 "C" by collecting and merging preprocessed features a1, b1, . . . , and n1 output from the plurality of first models 320.

In one or more embodiments of the disclosure, the preprocessed features 330 "C" may be input to a second model 340. The second model 340 may obtain probability values 350 of applications that may be predicted to be executed on the electronic device 2000 by analyzing a correlation between the preprocessed features 330. For example, as a result of inputting the preprocessed features 330 to the second model 340, a probability value that an application A may be executed at a future time on the electronic device 2000 may be 0.47, a probability value that an application B may be executed may be 0.24, and a probability value that an application C may be executed may be 0.11.

In one or more embodiments of the disclosure, the second model 340 may be a machine learning model using the ensemble algorithm, for example, a machine learning model using the XGBoost module, which may be a boosting module. Furthermore, the second model 340 may not be stored in a file format in the electronic device 2000, and may be obtained by transforming operations performed in the second model 340 into code through a M2C transformation.

The electronic device 2000, according to one or more embodiments of the disclosure, may execute one or more applications in the background process of the electronic device 2000 based on the probability values 350 of the applications.

In one or more embodiments of the disclosure, the electronic device 2000 may identify available computing resources of the electronic device 2000 and determine the number of applications to be executed in the background process based on the available computing resources. For example, as a result of identifying the available computing resources of the electronic device 2000, the number of applications executable in the background process may be two. In one or more examples, the electronic device 2000 may execute two applications having the highest probability values (e.g., application A and application B), in the background process of the electronic device 2000.

In one or more embodiments of the disclosure, after the available computing resources are identified, the electronic device 2000 may obtain information about a required amount of computing resources of the application. For example, as described above, the number of applications executable in the background process may be determined to be two, but the application B may not be able to be executed in the background process due to a large required amount of computing resources when the application A is executed in the background process. In one or more examples, the electronic device 2000 may execute one application having the highest probability value (e.g., application A), in the background process of the electronic device 2000.

In one or more embodiments of the disclosure, the electronic device 2000 may determine, based on a threshold value, an application to be executed in the background process of the electronic device 2000. The electronic device 2000 may execute, in the background process, only applications that are highly likely to be executed. For example, a threshold value may be 0.3, and the probability value of the application B may be 0.24, which is less than the threshold value 0.3. In one or more examples, because a probability that the application B may be executed in the future on the electronic device 2000 is low (e.g., below the threshold), the electronic device 2000 may not execute the application B in the background process of the electronic device 2000.

Figure 4:
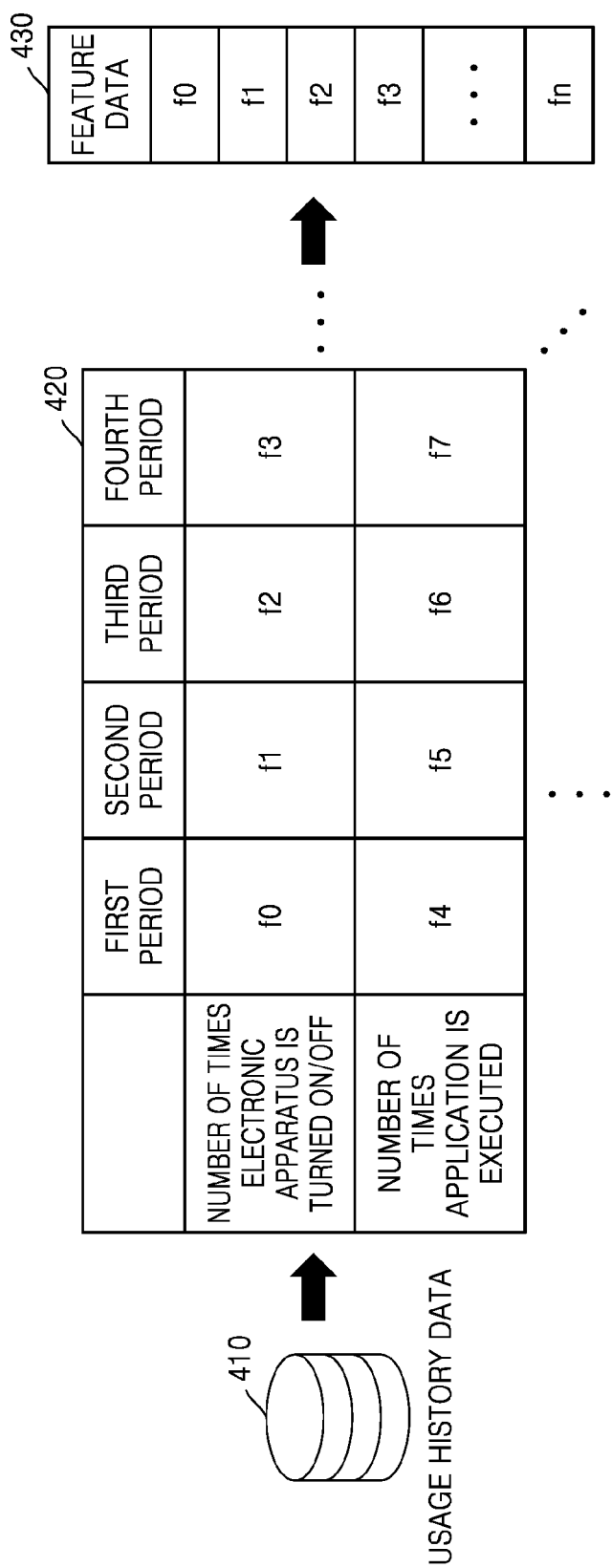
FIG. 4 is a diagram for describing an operation in which an electronic device obtains feature data, according to one or more embodiments of the disclosure.

FIG. 4 is a diagram for describing an operation in which the electronic device obtains feature data, according to one or more embodiments of the disclosure.

In one or more embodiments of the disclosure, the electronic device 2000 may obtain feature data 430, including features indicating attributes related to a usage history of the electronic device 2000, by obtaining usage history data 410 and processing the usage history data 410.

The usage history data 410 collected in response to use of the electronic device 2000 may include, for example, a turning on/off history of the electronic device 2000, an execution/termination history of an application installed on the electronic device 2000, a device setting history information (e.g., a brightness setting, a volume setting, etc.) related to functions of the electronic device 2000, or any other usage history data known to one of ordinary skill in the art. The usage history data may include time information when an event related to the usage history occurs.

In one or more embodiments of the disclosure, the electronic device 2000 may obtain the feature data 430 obtained by modifying/processing the usage history data 410 into statistical data. The electronic device 2000 may generate, based on the usage history data 410, statistical data for each situation during a particular period for each of a plurality of particular periods.

In one or more embodiments of the disclosure, the particular period may be a preset value. For example, the particular period may be one week. For example, referring to a table 420, a first period may be, e.g., a period from the present time to one week before, a second period may be a period from one week before to two weeks before, a third period may be a period from two weeks before to three weeks before, and a fourth period may be a period from three weeks before to four weeks before. Furthermore, a fifth period may be a period from four weeks before to five weeks before. Furthermore, the electronic device 2000 may generate feature data 430, by setting the particular period to another period (e.g., a period from the present time to four weeks before, all periods from the present time to past, etc.) and obtaining statistical data.

In one or more embodiments of the disclosure, the feature data 430 may be statistical data obtained by modifying/processing the usage history data 410. For example, a feature f0 included in the feature data may be the number of times the electronic device 2000 is turned on/off during the first period, a feature f1 may be the number of times the electronic device 2000 is turned on/off during the second period, a feature f2 may be the number of times the electronic device 2000 is turned on/off during the third period, and a feature f3 may be the number of times the electronic device 2000 is turned on/off during the fourth period. Also, the feature f4 may be the number of executions of the application installed on the electronic device 2000 during the first period, a feature f5 may be the number of executions of the application installed on the electronic device 2000 during the second period, a feature f6 may be the number of executions of the application installed on the electronic device 2000 during the third period, and a feature f7 may be the number of executions of the application installed on the electronic device 2000 during the fourth period. In one or more examples, the number of executions of the application may be independently counted for each application, rather than counting whether all applications installed on the electronic device 2000 are executed.

Although the feature data 430 that is statistical data obtained by modifying/processing the usage history data 410 has been described, this is feature data 430 only an example. The feature data 430 may be any other statistical data known to one of ordinary skill in the art that may be generated from the usage history data 410. For example, the feature data 430 may include statistical data, such as statistics on the number of executions, execution time, and an execution ratio of the application installed on the electronic device 2000 for weekdays/weekends during each particular period, statistics on the number of executions, execution time, and execution ratio of the application installed on the electronic device 2000 for time/day of the week during each particular period, an execution time and occupancy ratio of the application installed on the electronic device 2000 during each particular period, the number of executions and execution ratio of the application during each particular period, and the number of times the electronic device 2000 is turned on during each particular period. Furthermore, the feature data 430 may include statistical data about the presence of a record of application execution for a particular period (e.g., within 1/5/10/30/60/180/1,440/2,880/4,320/10,080 minutes from the present). The feature data 430 may further include setting preferences such as a screen brightness, a sound mode, or any other setting, for each situation (e.g., a situation in which a particular application is running), an elapsed time since the application was last executed, an interval between times at which the power of the electronic device 2000 is turned on, a screen resolution of the electronic device 2000, a display size, a network connection, or any other setting preference known to one of ordinary skill in the art.

Figure 5:
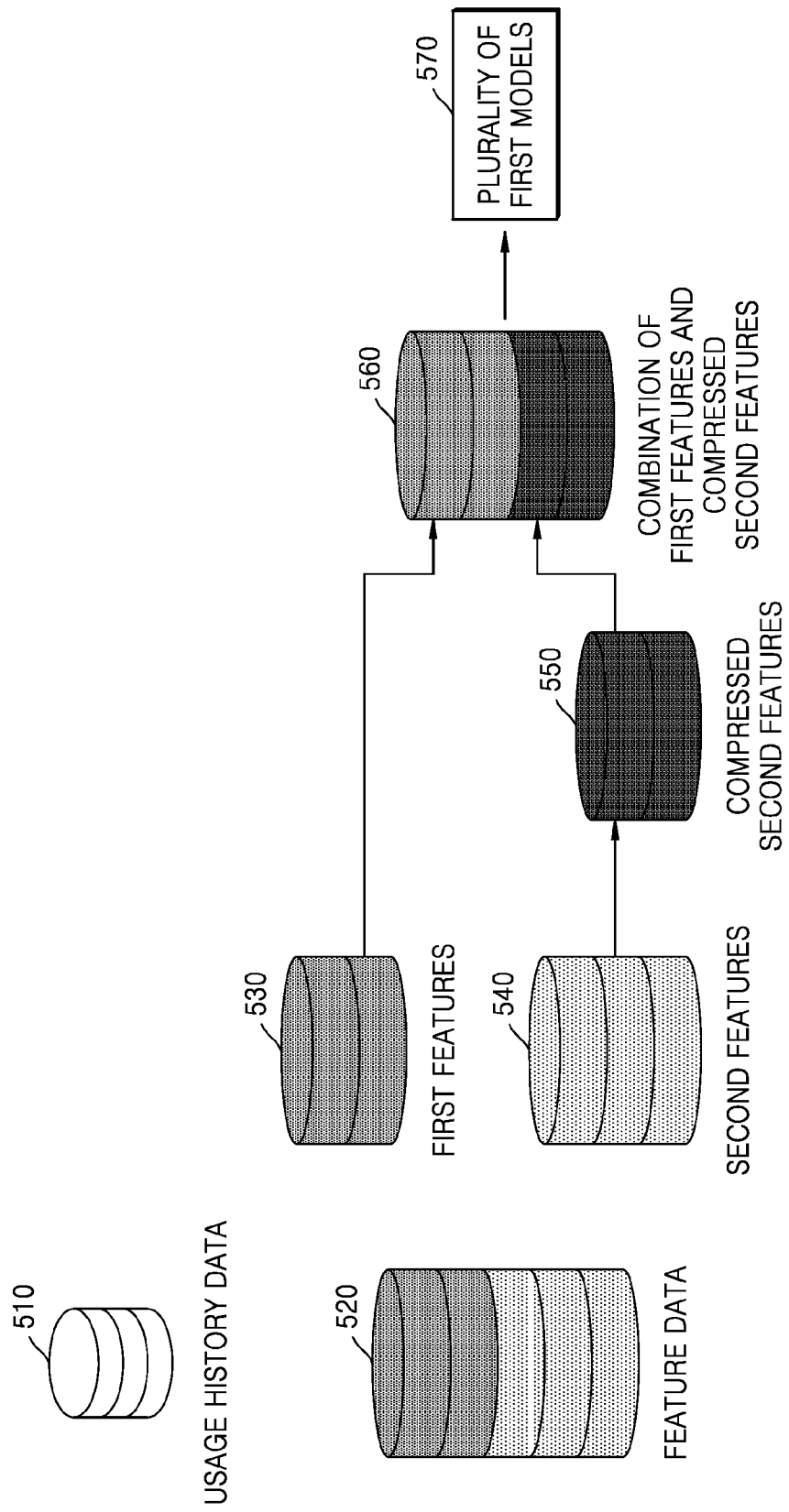
FIG. 5 is a diagram for describing a process in which an electronic device obtains a combination of first features and compressed second features by processing feature data, according to one or more embodiments of the disclosure.

FIG. 5 is a diagram for describing a process in which the electronic device obtains combinations of first features and compressed second features by processing feature data, according to one or more embodiments of the disclosure.

In one or more embodiments of the disclosure, the electronic device 2000 may obtain feature data 520 by obtaining usage history data 510 and processing the usage history data 510, according to one or more embodiments described above.

In one or more embodiments of the disclosure, the electronic device 2000 may obtain priority information about features included in the feature data 520. The electronic device 2000 may divide the feature data 520 into first features 530 and second features 540 based on priority information. The electronic device 2000 may divide the features into the first features 530 and the second features 540 based on a preset ratio. For example, the electronic device 2000 may classify the top N % (e.g., 10%) features having a high priority as the first features 530 and classify the other features as the second features 540. A method by which the electronic device 2000 obtains the priority information will be further described with reference to FIG. 7, and a method by which the electronic device 2000 divides the feature data 520 based on the priority information will be further described with reference to FIG. 8.

In one or more embodiments of the disclosure, the electronic device 2000 may obtain compressed second features 550 by compressing the second features 540. The electronic device 2000 may compress the second features 540, which may low-priority features due to the importance of these features being relatively lower than that of first features.

The electronic device 2000 may reduce dimensions of the second features 540 by applying the dimensionality reduction algorithm to the second features 540. The dimensionality reduction algorithm may include, for example, PCA, LDA, SVD, or any other reduction algorithm known to one of ordinary skill in the art. Furthermore, the electronic device 2000 may compress the second features 540 by using the feature extraction method of compressing and extracting the second features 540 into lower-dimensional important features. Feature extraction will be further described with reference to FIG. 9.

The electronic device 2000 generates a combination 560 of first features and compressed second features by combining the compressed second features 550 with the first features 530. The combination 560 of first features and compressed second features may be used as input data to be input to each of a plurality of first models 570.

The electronic device 2000, according to one or more embodiments of the disclosure, may obtain preprocessed features by using the plurality of first models 570, and obtain probability value of an application that is predicted to be executed on the electronic device 2000 by using a second model, as described above with reference to FIG. 3.

Figure 6:
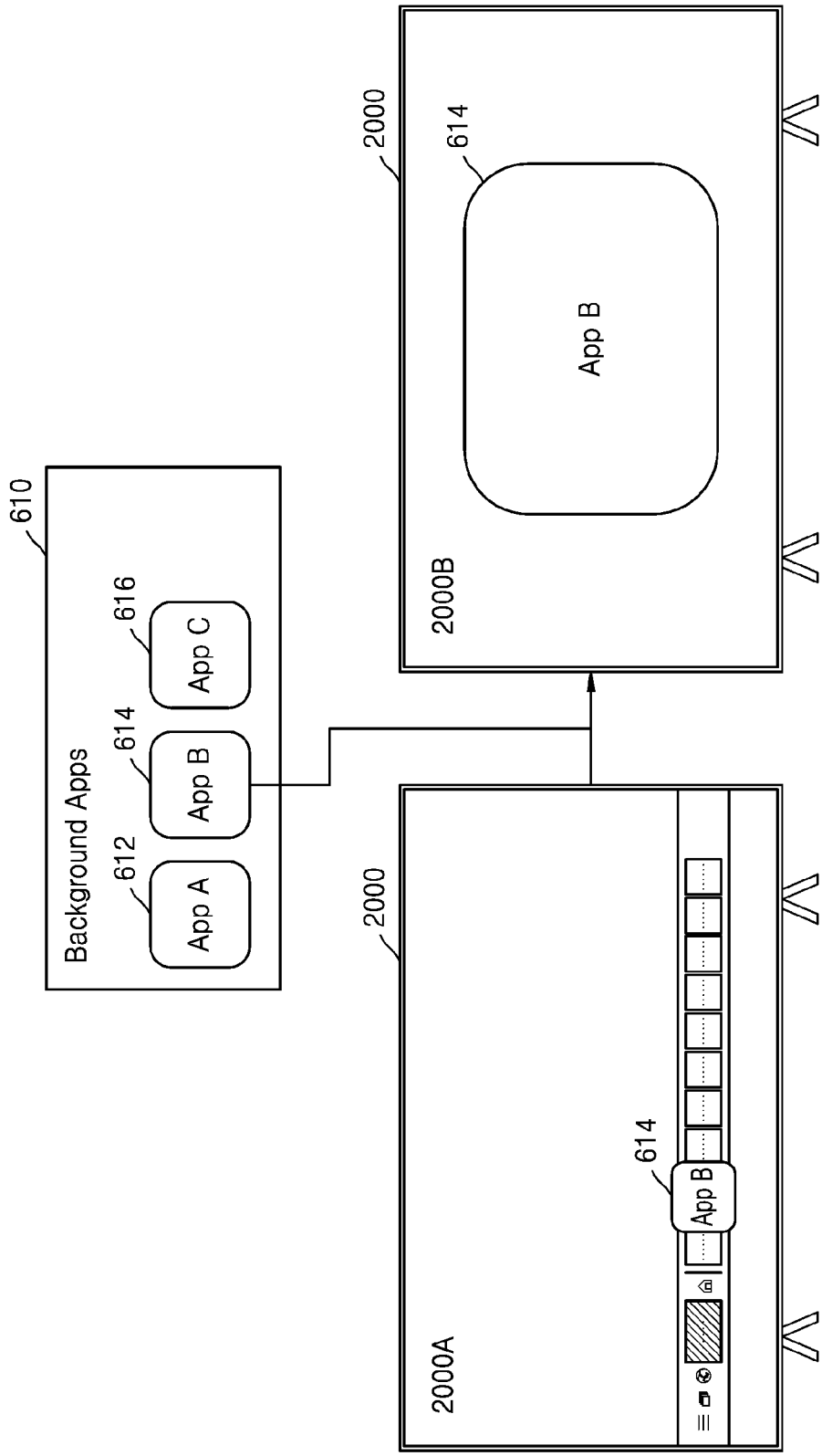
FIG. 6 is a diagram for describing an operation in which an electronic device executes an application running in a background process according to a user input, according to one or more embodiments of the disclosure.

FIG. 6 is a diagram for describing an operation in which the electronic device executes an application running in a background process according to a user input, according to one or more embodiments of the disclosure.

Referring to FIG. 6, the electronic device 2000, according to one or more embodiments of the disclosure, may obtain probability values of applications that may be predicted to be executed on the electronic device 2000, and execute the one or more applications in a background 610 of the electronic device 2000 based on the probability values. For example, as a result of the electronic device 2000 obtaining the probability values of the applications by using a second model, the probability values of the applications that may be predicted to be executed on the electronic device 2000 may be in the same order as application A 612, application B 614, application C 616, application X, and application Y. In one or more examples, the electronic device 2000 may determine the application A 612, the application B 614, and the application C 616 as applications to be executed in the background 610.

In one or more embodiments of the disclosure, the electronic device 2000 may identify an application execution request. For example, it may be identified that a touch input for executing an application may be input to a screen of the electronic device 2000 or that an application execution request is received from another electronic device (e.g., a remote controller, a smartphone, etc.).

When the application execution request is identified, the electronic device 2000 may identify whether the identified application execution request is an execution request for an application executed in the background 610. In response to identifying an execution request for one of one or more applications executed in the background 610, the electronic device 2000 may display an application corresponding to the execution request on the screen of the electronic device 2000.

For example, when an execution request for the application B 614 is identified (e.g., screen 2000A), the electronic device 2000 may execute the application B 614 in a state to be immediately executable as a resource for executing an application is loaded in the background 610, and display an execution screen of the application B 614 on the screen of the electronic device 2000 (e.g., screen 2000B).

Figure 7:
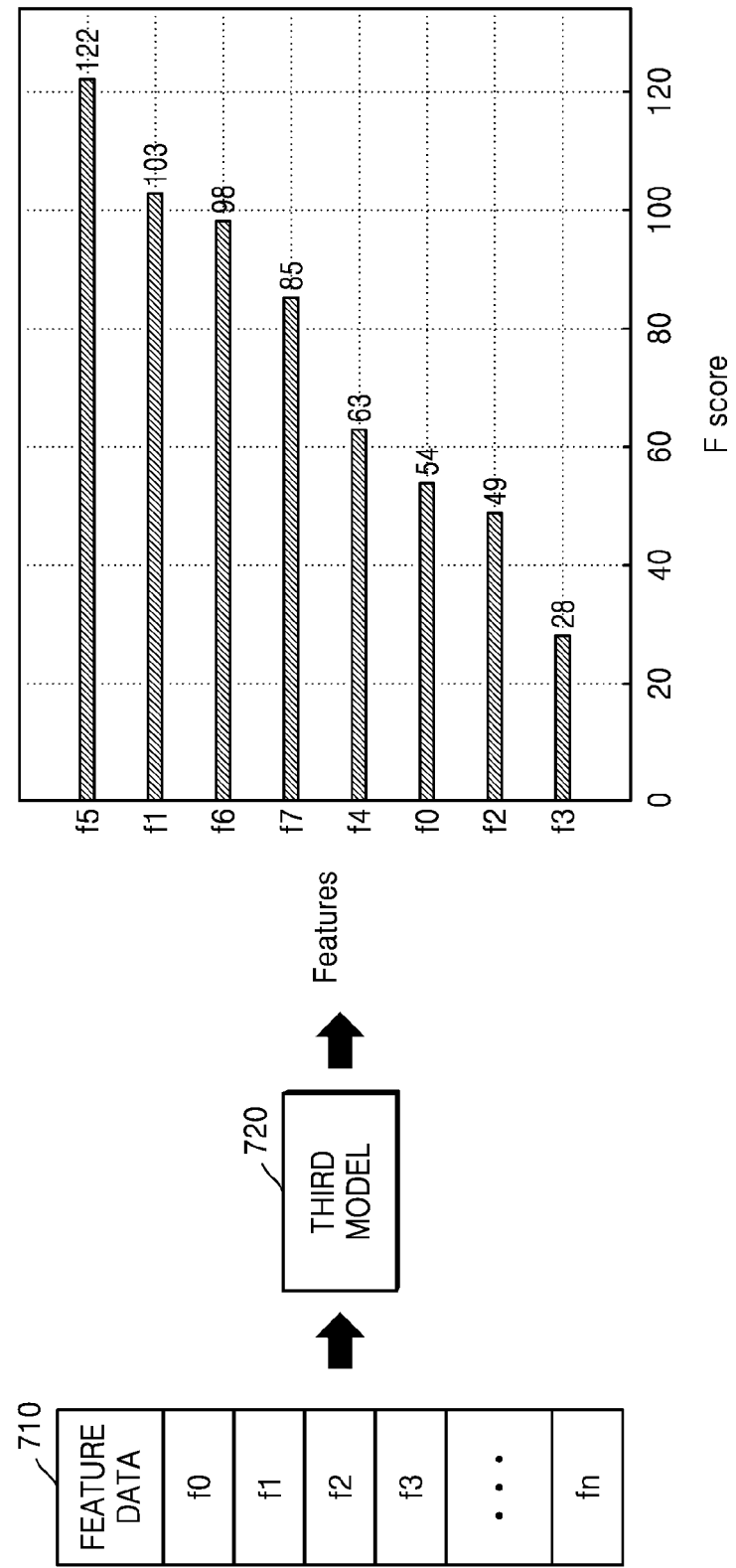
FIG. 7 is a diagram for describing an operation in which an electronic device obtains priority information about features within feature data, according to one or more embodiments of the disclosure.

FIG. 7 is a diagram for describing an operation in which the electronic device obtains priority information about features within feature data, according to one or more embodiments of the disclosure.

In one or more embodiments of the disclosure, the electronic device 2000 may obtain importance information 730 of features by inputting feature data 710 into a third model 720.

In one or more embodiments of the disclosure, the third model 720 may be a model trained to receive the feature data 710 and output a probability value of an application that is predicted to be executed on the electronic device 2000.

When the machine learning model is trained using the features, the electronic device 2000 may obtain importance of the features, which may be determined in a training process of the machine learning model. The importance of the features may refer to the degree to which the features affect a prediction determination process of the machine learning model, and a feature that has more influence on the prediction determination process of the machine learning model may have greater importance. For example, when the probability value of the application that is predicted to be executed on the electronic device 2000 is determined, a feature that has more influence on the prediction determination process may have greater importance.

In one or more embodiments of the disclosure, the third model 720 may be a machine learning model using the ensemble algorithm, for example, a machine learning model using the XGBoost module, which may be a boosting module. The electronic device 2000 may obtain importance of features included in the feature data 710 by using a feature importance function of the XGBoost model.

In one or more embodiments of the disclosure, the electronic device 2000 may determine a priority of a feature to be high based on the importance of the being high. Referring to a graph 730 illustrating the importance of the features, the importance of the features are in the order of f5, f1, f6, f7, f4, f0, f2, f3, and thus, the electronic device 2000 may obtain priority information in which the features are listed in order of importance.

The electronic device 2000, according to one or more embodiments of the disclosure, may divide the feature data 710 into first features and second features based on the priority information about the features, which will be further described with reference to FIG. 8.

Figure 8:
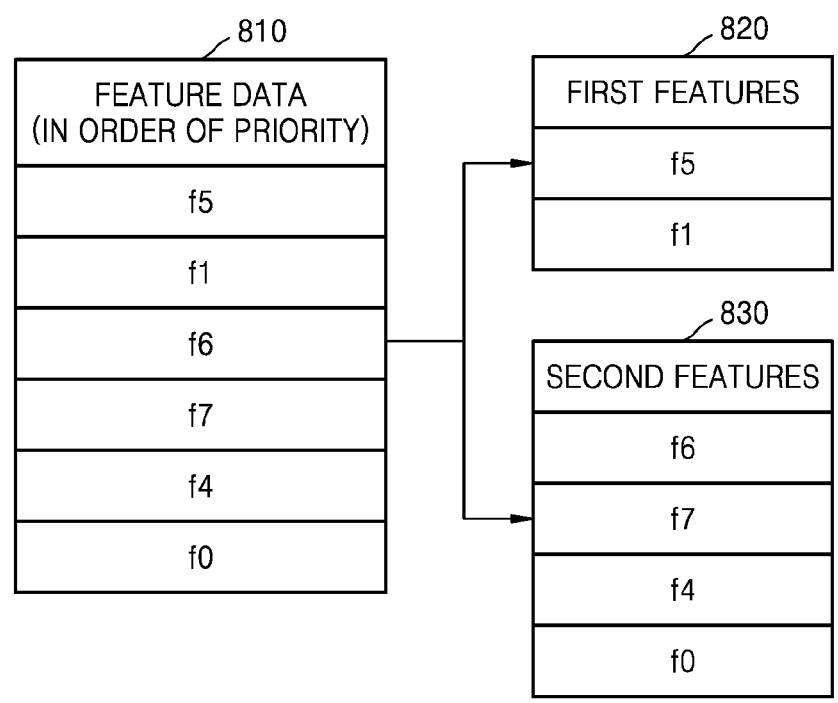
FIG. 8 is a diagram for describing an operation in which an electronic device divides feature data, according to one or more embodiments of the disclosure.

FIG. 8 is a diagram for describing an operation in which the electronic device divides feature data, according to one or more embodiments of the disclosure.

Referring to FIG. 8, the electronic device 2000, according to one or more embodiments of the disclosure, may divide feature data 810 based on priority information about the feature data 810 according to one or more embodiments described above. For example, when the feature data 810 is listed in order of priority, the feature data 810 may be listed in the order of f5, f1, f6, f7, f4, and f0. The electronic device 2000 may divide features of the feature data 810 into first features 820 and second features 830 based on a preset ratio. For example, the electronic device 2000 may classify the top N % (e.g., 10%) features having a high priority as the first features 820, and classify the other features as the second features 830. Alternatively, the electronic device 2000 may classify the top N (where N is an integer number) features having a high priority as the first features 820 and classify the other features as the second features 830.

As a result of the electronic device 2000, according to one or more embodiments of the disclosure, dividing the feature data 810 into the first features 820 and the second features 830 based on the priority information, the first features 820 may include f5 and f1, and the second features 830 may include f6, f7, f4, and f0. The electronic device 2000 may generate compressed second features by compressing the second features 830, which will be further described with reference to FIG. 9.

Figure 9:
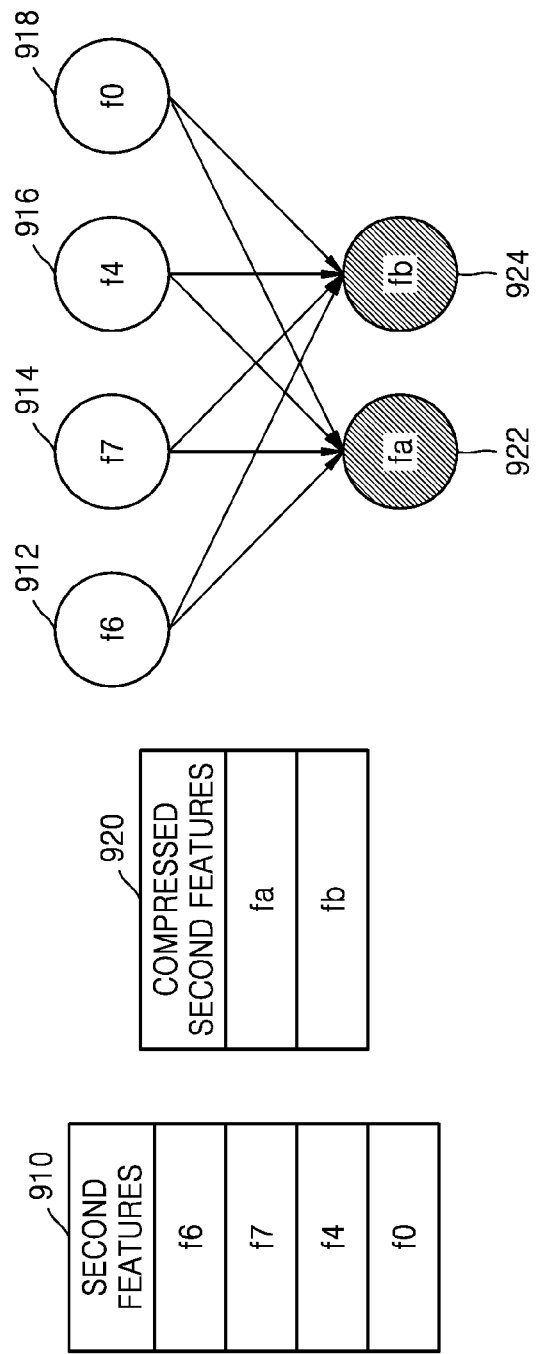
FIG. 9 is a diagram for describing an operation in which an electronic device compresses second features, according to one or more embodiments of the disclosure.

FIG. 9 is a diagram for describing an operation in which the electronic device compresses second features, according to one or more embodiments of the disclosure.

In one or more embodiments of the disclosure, the electronic device 2000 may apply the dimensionality reduction algorithm to second features 910. The dimensionality reduction algorithm may include, for example, PCA.

In one or more embodiments of the disclosure, the electronic device 2000 may compress the second features 910 by using the feature extraction method of compressing and extracting the second features 910 into lower-dimensional important features. For example, the second features 910 may include f6 912, f7 914, f4 916, and f0 918. In one or more examples, the electronic device 2000 may obtain fa 922 and fb 924, which are features obtained by compressing the f6 912, f7 914, f4 916, and f0 918 by using the feature extraction method. In one or more examples, the compressed features fa 922 and fb 924 have new values different from the existing features f6 912, f7 914, f4 916, and f0 918.

In one or more embodiments of the disclosure, the electronic device 2000 may compress the second features 910 by using a feature selection method of removing unnecessary features from among the second features 910. For example, the electronic device 2000 may select only f6 912 and f4

916, which are features that may make use of characteristics of data, from among the second features 910, f6 912, f7 914, f4 916, and f0 918.

The electronic device 2000, according to one or more embodiments of the disclosure, may obtain compressed second features 920 by compressing the second features 910 by using the dimensionality reduction algorithm described above. In addition, although the PCA has been described as an example of the dimensionality reduction algorithm, the method by which the electronic device 2000 compresses the second features 910 is not limited thereto. The electronic device 2000 may obtain the compressed second features 920 by using another dimensionality reduction algorithm, such as LDA or SVD, or any other dimensionality reduction algorithm known to one of ordinary skill in the art.

Figure 10:
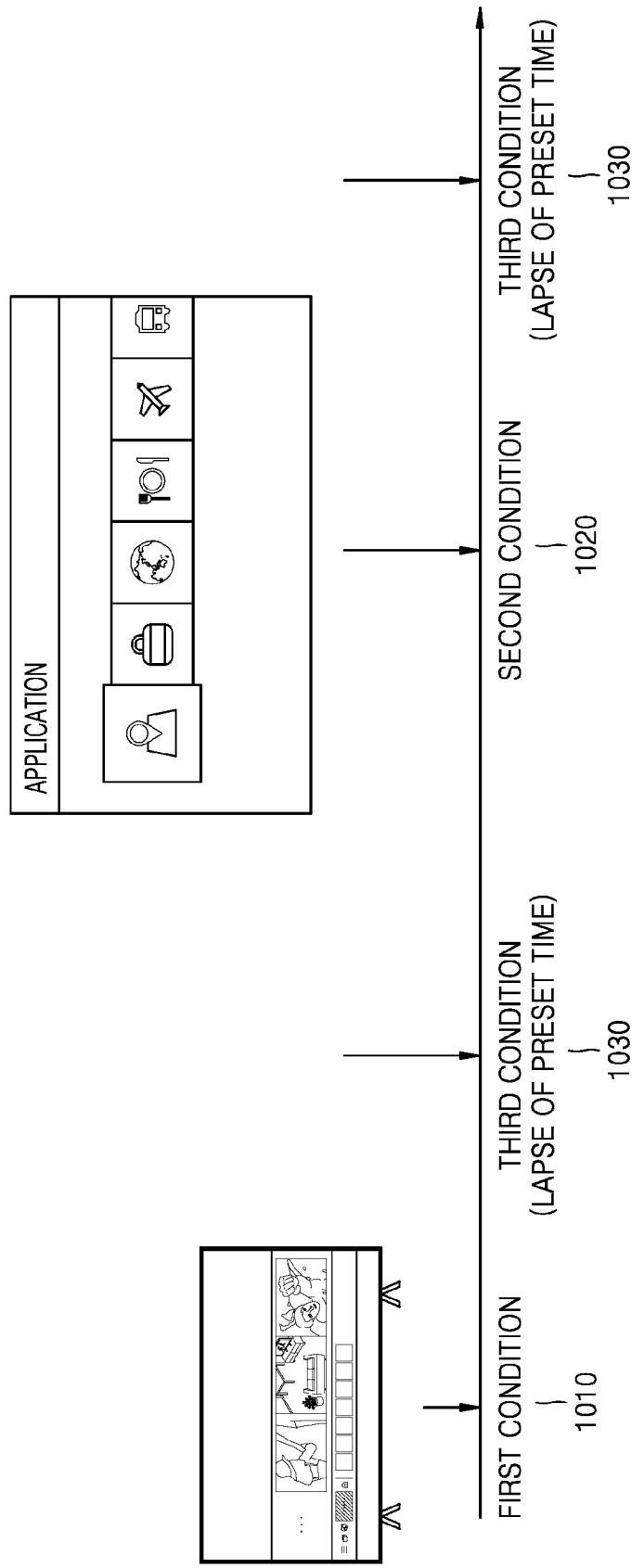
FIG. 10 is a diagram for describing an operation in which an electronic device obtains probability values of applications that are predicted to be executed on the electronic device, based on a preset execution condition of a second model, according to one or more embodiments of the disclosure.

FIG. 10 is a diagram for describing an operation in which the electronic device obtains probability values of applications that may be predicted to be executed on the electronic device, based on a preset execution condition of a second model, according to one or more embodiments of the disclosure.

In one or more embodiments of the disclosure, a second model for obtaining probability values of applications that may be predicted to be executed on the electronic device 2000 may not be stored in a file format in the electronic device 2000, and may be obtained by transforming operations performed in the second model into code through a M2C transformation. The electronic device 2000 may transform the second model into code and store the same in a compiled state, and execute the code to obtain probability values of applications to be executed on the electronic device 2000. Therefore, memory occupancy and file input/output overhead that occur when the second model is stored in a file format may be reduced, and a loading time and operation time of the second model may be reduced.

In one or more embodiments of the disclosure, in order to determine applications to be executed in a background process, the electronic device 2000 may execute the second model to obtain the probability values of the applications that may be predicted to be executed on the electronic device 2000. In one or more examples, the electronic device 2000 may execute the second model, in response to identifying the occurrence of a preset execution condition of the second model. A preset condition for the electronic device 2000 to execute the code obtained by transforming the second model may include, for example, at least one of a case in which the power of the electronic device 2000 is turned on, a case in which an application executed on the electronic device 2000 is switched, or a case in which a preset time interval has elapsed.

In one or more embodiments of the disclosure, a first condition 1010 that is a preset condition may be a power-on event of the electronic device 2000. When the power-on event is identified, the electronic device 2000 may execute the second model to obtain probability values of applications that may be predicted to be executed on the electronic device 2000. The electronic device 2000 may execute one or more applications in a background process of the electronic device 2000 based on the probability values obtained in response to identifying the occurrence of the first condition 1010.

In one or more embodiments of the disclosure, a second condition 1020 that is a preset condition may be an application execution event or an application switch event (e.g., switching from a first application to a second application) in the electronic device 2000. When the application execution event or the application switch event is identified, the electronic device 2000 may obtain probability values of applications that may be predicted to be executed on the electronic device 2000 by re-executing the second model. The electronic device 2000 may update the one or more applications executed in the background process of the electronic device 2000 based on the probability values obtained in response to identifying the occurrence of the second condition 1020.

In one or more embodiments, a third condition 1030 that is a preset condition may be a preset time lapse event. When the preset time lapse event is identified, the electronic device 2000 may obtain probability values of applications that may be predicted to be executed on the electronic device 2000 by re-executing the second model. A preset time lapse may include, e.g., the lapse of a preset time after the power of the electronic device 2000 is turned on, or the lapse of a preset time after the application of the electronic device 2000 is executed or the application is switched. Alternatively, the electronic device 2000 may re-execute the second model based on a preset time (e.g., every 30 minutes, every hour on the hour, etc.). The electronic device 2000 may update the one or more applications executed in the background process of the electronic device 2000 based on the probability values obtained in response to identifying the occurrence of the third condition 1030.

Figure 11:
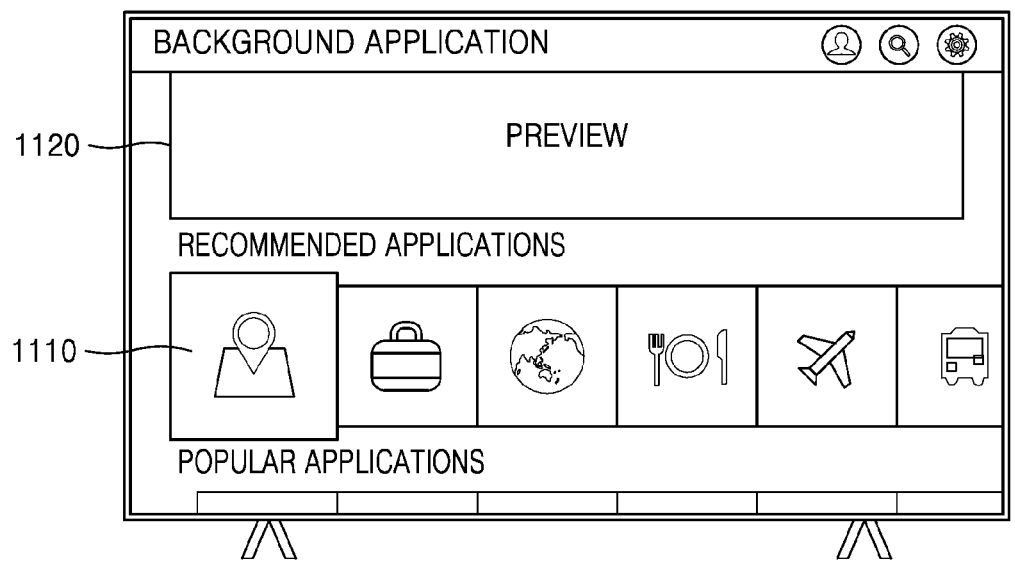
FIG. 11 is a diagram for describing an operation in which an electronic device displays an application running in a background process, according to one or more embodiments of the disclosure.

FIG. 11 is a diagram for describing an operation in which the electronic device displays an application running in a background process, according to one or more embodiments of the disclosure.

In one or more embodiments of the disclosure, the electronic device 2000 may display, on the display of the electronic device 2000, one or more applications executed in the background process of the electronic device 2000, according to one or more embodiments described above.

In one or more embodiments of the disclosure, the applications executed in the background process of the electronic device 2000 may correspond to applications predicted to be executed in the future on the electronic device 2000 that are executed in the background, and thus, there is a high possibility that the applications are executed by a user. Accordingly, the electronic device 2000 may provide a user interface for recommending the applications executed in the background process to the user.

In one or more embodiments of the disclosure, when one of the applications executed in the background process is selected, the electronic device 2000 may display a preview screen of the selected application together. For example, when the user selects an application A 1110, which is one of the applications executed in the background process, after the electronic device 2000 displays the applications executed in the background process, the electronic device 2000 may display a preview screen 1120 related to the application A 1110 on the electronic device 2000.

Figure 12:
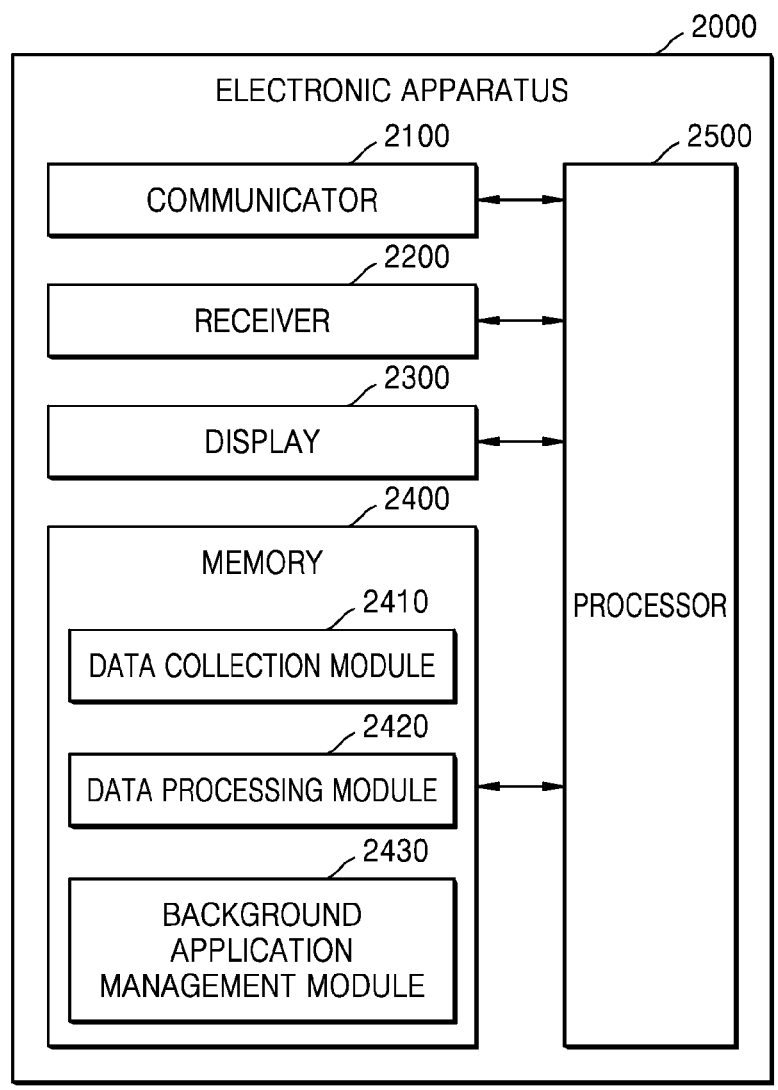
FIG. 12 is a block diagram of a configuration of an electronic device according to one or more embodiments of the disclosure.

FIG. 12 is a block diagram of a configuration of the electronic device according to one or more embodiments of the disclosure.

Referring to FIG. 12, the electronic device 2000, according to one or more embodiments of the disclosure, may include a communicator 2100, a receiver 2200, a display 2300, a memory 2400, and a processor 2500.

The communicator 2100 may perform data communication with a server or other electronic devices under the control by the processor 2500. For example, the communicator 2100 may request and receive an image, a video, or audio from the outside of the electronic device 2000.

The communicator 2100 may perform data communication with the server or the other electronic devices by using at least one of data communication methods including, e.g., wired local field network (LAN), wireless LAN, Wi-Fi, Bluetooth, Zigbee, Wi-Fi Direct (WFD), infrared data association (IrDA), Bluetooth low energy (BLE), near field communication (NFC), wireless broadband Internet (Wibro), world interoperability for microwave access (WiMAX), shared wireless access Protocol (SWAP), wireless gigabit alliance (WiGig), or radio frequency (RF) communication.

The receiver 2200 may receive an image, a video, or audio from the outside of the electronic device 2000 under the control by the processor 2500.

The receiver 2200 may include, e.g., at least one of a high-definition multimedia interface (HDMI) port, a component jack, a PC port, a display port, or a universal serial bus (USB) port.

The display 2300 may output an image signal on the screen of the electronic device 2000 under the control by the processor 2500.

The memory 2400 may store instructions, data structures, and program code readable by the processor 2500. In the embodiments of the disclosure, operations performed by the processor 2500 may be implemented by executing instructions or code of a program stored in the memory 2400.

The memory 2400 may include a non-volatile memory including at least one of a flash memory, a hard disk, a multimedia card micro type memory, a card type memory (e.g., secure digital (SD) or extreme digital (XD) memory), random access memory (RAM), static RAM (SRAM), read-only memory (ROM), electrically erasable programmable ROM (EEPROM), programmable ROM (PROM), a magnetic memory, a magnetic disk, or an optical disk, and a volatile memory such as RAM or SRAM.

The memory 2400 according to one or more embodiments of the disclosure may store one or more instructions or programs that cause the electronic device 2000 to operate to execute one or more applications that may be predicted to be highly likely to be executed by a user in the future in a background process. For example, the memory 2400 may store a data collection module 2410, a data processing module 2420, and a background application management module 2430.

The processor 2500 may control the overall operations of the electronic device 2000. For example, the processor 2500 may control the overall operations for the electronic device 2000 to execute an application in the background process, by executing one or more instructions of the program stored in the memory 2400. The processor 2500 may include one or more neural network processors for operating machine learning models used to calculate probability values of applications that may be predicted to be executed on the electronic device 2000.

The processor 2500 may include, e.g., at least one of a central processing unit, a microprocessor, a graphic processing unit, application specific integrated circuits (ASICs), digital signal processors (DSPs), digital signal processing devices (DSPDs), programmable logic devices (PLDs), field programmable gate arrays (FPGAs), an application processor, a neural processing unit, or an artificial intelligence-only processor designed with a hardware structure specialized for processing of an artificial intelligence model, but is not limited thereto.

In one or more embodiments of the disclosure, the processor 2500 may execute the data collection module 2410 to collect data related to a usage history of the electronic device 2000. Usage history data refers to various types of data collected in response to use of the electronic device 2000. The usage history data may include, e.g., a turning on/off history of the electronic device 2000, an execution/termination history of an application installed on the electronic device 2000, device setting history information (e.g., a brightness setting, a volume setting, etc.) related to functions of the electronic device 2000, or any other usage history data known to one of ordinary skill in the art. The usage history data may include time information when an event related to the usage history occurs.

In one or more embodiments of the disclosure, the processor 2500 may execute the data processing module 2420 to process various types of data for executing the machine learning model in the electronic device 2000. The processor 2500 may obtain feature data including features indicating attributes related to the usage history of the electronic device 2000 by processing the usage history data collected by the data collection module 2410. The features indicating the attributes related to the usage history refer to statistical data obtained by modifying/processing the usage history data. The features indicating the attributes related to the usage history may include, for example, the number of times the electronic device 2000 is turned on/off during a particular period, a time when the electronic device 2000 is turned on/off during a particular period, the number of executions/terminations of the application installed on the electronic device 2000 during a particular period, or any other usage history know to one of ordinary skill in the art. The processor 2500 may determine priorities of the features of the feature data. The processor 2500 may train the machine learning model using the features, and obtain importance of the features, which may be determined in a training process of the machine learning model. The electronic device 2000 may determine a priority of a feature to be high based on the importance of the feature being high. The processor 2500 may divide the features into first features and second features, by classifying features having a relatively high priority as the first features, and classifying features having a relatively lower priority than the first features, as the second features. The processor 2500 may generate compressed second features by applying the dimensionality reduction algorithm to the second features. The processor 2500 may obtain preprocessed features by combining the first features with the compressed second features, and inputting a combination of the first features and the compressed second features to a plurality of first models. The preprocessed features may refer to features obtained by preprocessing the first features and the compressed second feature by using a first model, in order for the processor 2500 to obtain execution probability values of applications by using a second model. The processor 2500 may obtain probability values of applications that may be predicted to be executed on the electronic device 2000 by applying the preprocessed features to the second model.

In one or more embodiments of the disclosure, the processor 2500 may execute the background application management module 2430 to manage one or more background applications executed on the electronic device 2000. The processor 2500 may execute one or more applications in the background process based on the execution probability values of the applications obtained by the second model. The processor 2500 may identify available computing resources of the electronic device 2000, and execute the one or more applications in the background according to the available computing resources. When the execution probability values of the applications are updated by the second model, the processor 2500 may change the one or more applications executed in the background process based on the updated execution probability values.

The operating method of the electronic device, according to one or more embodiments of the disclosure, may be embodied as program commands executable by various computer means and may be recorded on a computer-readable recording medium. The computer-readable recording medium may include program commands, data files, data structures, etc. alone or in combination. The program commands recorded on the computer-readable recording medium may be specifically designed and configured for the disclosure or may be well-known and available to one of ordinary skill in the art. Examples of the computer-readable recording medium include magnetic media (e.g., hard disks, floppy disks, magnetic tapes, etc.), optical media (e.g., compact disk (CD)-ROM, or digital versatile disks (DVDs)), magneto-optical media (e.g., floptical disks), and hardware devices specifically configured to store and execute program commands (e.g., ROM, RAM, flash memories, etc.). Examples of the program commands include high-level language code that can be executed by a computer by using an interpreter or the like as well as machine language code generated by a compiler. The computer-readable recording medium may be provided as a non-transitory recording medium. In one or more examples, the non-transitory recording medium may mean that the non-transitory recording medium is a tangible device, and does not include a signal (e.g., an electromagnetic wave), but does not differentiate between where data is semi-permanently stored in the recording medium and where the data is temporarily stored in the recording medium. For example, the "non-transitory recording medium" may include a buffer in which data is temporarily stored.

Furthermore, the operating method of the electronic device, according to one or more embodiments of the disclosure, may be provided by being included in a computer program product. The computer program product may be traded between a seller and a buyer as a commodity.

The computer program product may include an S/W program or a computer-readable storage medium storing the S/W program. For example, the computer program product may include a product that is electronically distributed as a software program (e.g., a downloadable application) via an electronic device manufacturer or an electronic market. For electronic distribution, at least a part of the S/W program may be stored in a storage medium or may be temporarily generated. In one or more examples, the storage medium may be a storage medium of a server of a manufacturer, a server of an electronic market, or a relay server that temporarily stores the S/W program.

The computer program product may include a storage medium of a server or a storage medium of a client device in a system including the server and the client device. Alternatively, when there is a third device (e.g., a smartphone) communicating with the server or the client device, the computer program product may include a storage medium of the third device. Alternatively, the computer program product may include a software program itself transmitted from the server to the client device or the third device or from the third device to the client device.

In one or more examples, one of the server, the client device, and the third device may execute a method according to one or more embodiments of the disclosure by executing the computer program product. Alternatively, at least two of the server, the client device, and the third device may execute the method according to one or more embodiments of the disclosure in a distributed fashion by executing the computer program product.

For example, the server (e.g., a cloud server or an artificial intelligence server) may execute the computer program product stored in the server, and may control the client device communicating with the server to perform the method according to the embodiments of the disclosure.

While the embodiments of the disclosure have been described in detail, the scope of the disclosure is not limited thereto, and it will be understood by those of ordinary skill in the art that various changes in form and details may be made therein without departing from the spirit and scope as defined by the following claims.

The invention claimed is:

1. A method, performed by an electronic device, of executing an application in a background process, the method comprising:
   obtaining feature data including one or more features, each of the one or more features indicating one or more attributes related to a usage history of the electronic device;
   obtaining priority information corresponding to the one or more features of the feature data;
   based on the priority information, dividing the one or more features into first features and second features;
   compressing the second features;
   combining the first features with the compressed second features;
   obtaining preprocessed features by applying a combination of the first features and the compressed second features to a plurality of first machine learning models;
   obtaining, by applying the preprocessed features to a second machine learning model, probability values of a plurality of applications that are predicted to be executed on the electronic device; and
   based on the probability values, executing one or more applications from among the plurality of applications in the background process of the electronic device.

2. The method of claim 1, further comprising, based on identifying an execution request for an application of the one or more applications executed in the background process, displaying the application corresponding to the execution request on a screen of the electronic device.

3. The method of claim 1, wherein the obtaining the priority information corresponding to the one or more features comprises:
   training a third machine learning model by using the one or more features;
   obtaining importance information of each of the one or more features, the importance information being determined in a training process of the third machine learning model; and
   determining a priority of each of the one or more features based on respective importance information for each of the one or more features.

4. The method of claim 3, wherein the dividing the one or more features into the first features and the second features based on the priority information comprises, among the one or more features, dividing a first set of features having a priority higher than a threshold as the first features, and dividing other features not included in the first set of features as the second features, and
   wherein a number of the first features is less than a number of the second features.

5. The method of claim 1, wherein the compressing the second features comprises applying a dimensionality reduction algorithm to the second features.

6. The method of claim 1, wherein the plurality of first machine learning models comprise a plurality of machine learning models trained by using algorithms different from each other for each machine learning model in the plurality of machine learning models.

7. The method of claim 6, wherein the second machine learning model is a machine learning model trained by using an ensemble algorithm.

8. The method of claim 1, wherein the second machine learning model is obtained by transforming operations performed in the second machine learning model into code through a model-to-code (M2C) transformation, and
wherein the obtaining the probability values of the applications that are predicted to be executed on the electronic device comprises obtaining the probability values by executing the code obtained by transforming the second machine learning model through the M2C transformation.

9. The method of claim 8, wherein the obtaining the probability values of the applications that are predicted to be executed on the electronic device comprises:
identifying a preset execution condition of the second machine learning model; and
based on identifying an occurrence of the preset execution condition of the second machine learning model, obtaining the probability values by executing the code obtained by transforming the second machine learning model through the M2C transformation.

10. The method of claim 9, wherein the preset execution condition of the second machine learning model comprises at least one of (i) a case in which power of the electronic device is turned on, (ii) a case in which an application running on the electronic device is switched, or (iii) a case in which a preset time interval has elapsed.

11. An electronic device for executing an application in a background process, the electronic device comprising:
a display;
a memory storing one or more instructions; and
a processor configured to execute the one or more instructions stored in the memory to:
obtain feature data including one or more features, each of the one or more features indicating attributes related to a usage history of the electronic device,
obtain priority information corresponding to the one or more features of the feature data,
based on the priority information, divide the one or more features into first features and second features,
compress the second features,
combine the first features with the compressed second features,
obtain preprocessed features by applying a combination of the first features and the compressed second features to a plurality of first machine learning models,
obtain, by applying the preprocessed features to a second machine learning model, probability values of a plurality of applications that are predicted to be executed on the electronic device, and
based on the probability values, execute one or more applications from among the plurality of applications in the background process of the electronic device.

12. The electronic device of claim 11, wherein the processor is further configured to execute the one or more instructions to, based on an identification of an execution request for an application of the one or more applications executed in the background process, display the application corresponding to the execution request on a screen of the electronic device.

13. The electronic device of claim 11, wherein the processor is further configured to execute the one or more instructions to:
train a third machine learning model by using the one or more features;
obtain importance information of each of the one or more features, the importance information being determined in a training process of the third machine learning model; and
determine a priority of each of the one or more features based on respective importance information for each of the one or more features.

14. The electronic device of claim 13, wherein the processor is further configured to execute the one or more instructions to, among the one or more features, divide a first set of features having a priority higher than a threshold as the first features, and divide other features not included in the first set of features as the second features, and
wherein a number of the first features is less than a number of the second features.

15. The electronic device of claim 11, wherein the processor is further configured to execute the one or more instructions to apply a dimensionality reduction algorithm to the second features.

16. The electronic device of claim 11, wherein the plurality of first machine learning models comprise a plurality of machine learning models trained by using algorithms different from each other for each machine learning model in the plurality of machine learning models.

17. The electronic device of claim 16, wherein the second machine learning model is a machine learning model trained by using an ensemble algorithm.

18. The electronic device of claim 11, wherein the second machine learning model is obtained by transforming operations performed in the second machine learning model into code through a model-to-code (M2C) transformation, and
wherein the processor is further configured to execute the one or more instructions to obtain the probability values by execution of the code obtained by transformation of the second machine learning model through the M2C transformation.

19. The electronic device of claim 18, wherein the processor is further configured to execute the one or more instructions to:
identify a preset execution condition of the second machine learning model; and
based on identification of an occurrence of the preset execution condition of the second machine learning model, obtain the probability values by executing the code obtained by transformation of the second machine learning model through the M2C transformation.

20. A non-transitory computer-readable medium having instructions stored therein, which when executed by a processor in an electronic device cause the processor to execute a method of executing an application in a background process, the method comprising:
obtaining feature data including one or more features, each of the one or more features indicating attributes related to a usage history of the electronic device;
obtaining priority information corresponding to the one or more features of the feature data;
based on the priority information, dividing the one or more features into first features and second features;
compressing the second features;
combining the first features with the compressed second features;

obtaining preprocessed features by applying a combination of the first features and the compressed second features to a plurality of first machine learning models;

obtaining, by applying the preprocessed features to a second machine learning model, probability values of a plurality of applications that are predicted to be executed on the electronic device; and based on the probability values, executing one or more applications from among the plurality of applications in the background process of the electronic device.

* * * * *